No. 673,045. Patented Apr. 30, 1901.
H. COIFFIER, E. VIÉVILLE & A. MAJESTÉ.
MACHINE FOR MIXING AND MOLDING PLASTIC EARTHS.
(Application filed June 1, 1900.)
(No Model.) 5 Sheets—Sheet 1.
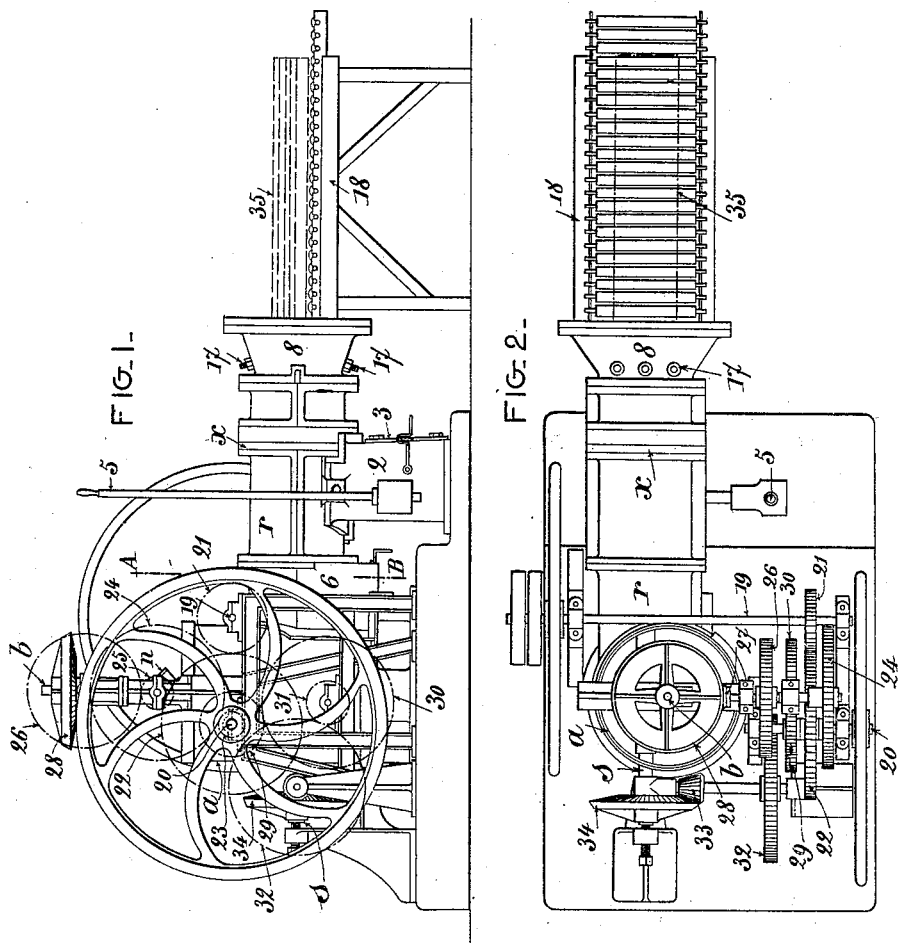

No. 673,045. Patented Apr. 30, 1901.
H. COIFFIER, E. VIÉVILLE & A. MAJESTÉ.
MACHINE FOR MIXING AND MOLDING PLASTIC EARTHS.
(Application filed June 1, 1900.)
(No Model.) 5 Sheets—Sheet 2.
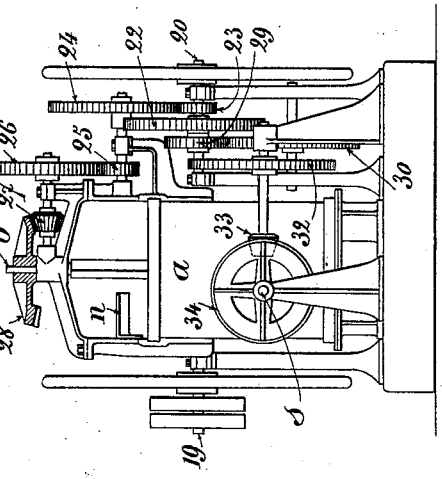
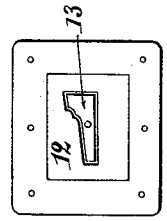
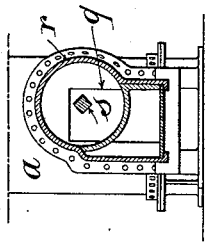

No. 673,045. Patented Apr. 30, 1901.
H. COIFFIER, E. VIÉVILLE & A. MAJESTÉ.
MACHINE FOR MIXING AND MOLDING PLASTIC EARTHS.
(Application filed June 1, 1900.)
(No Model.) 5 Sheets—Sheet 3.
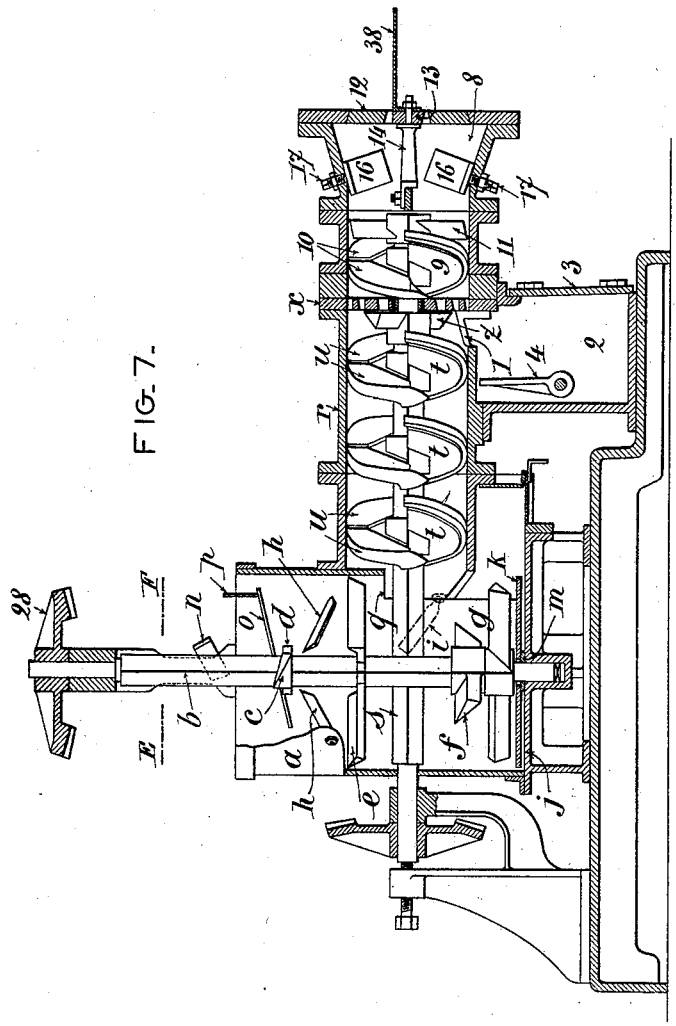

No. 673,045. Patented Apr. 30, 1901.
H. COIFFIER, E. VIÉVILLE & A. MAJESTÉ.
MACHINE FOR MIXING AND MOLDING PLASTIC EARTHS.
Application filed June 1, 1900.
(No Model.) 5 Sheets—Sheet 4.
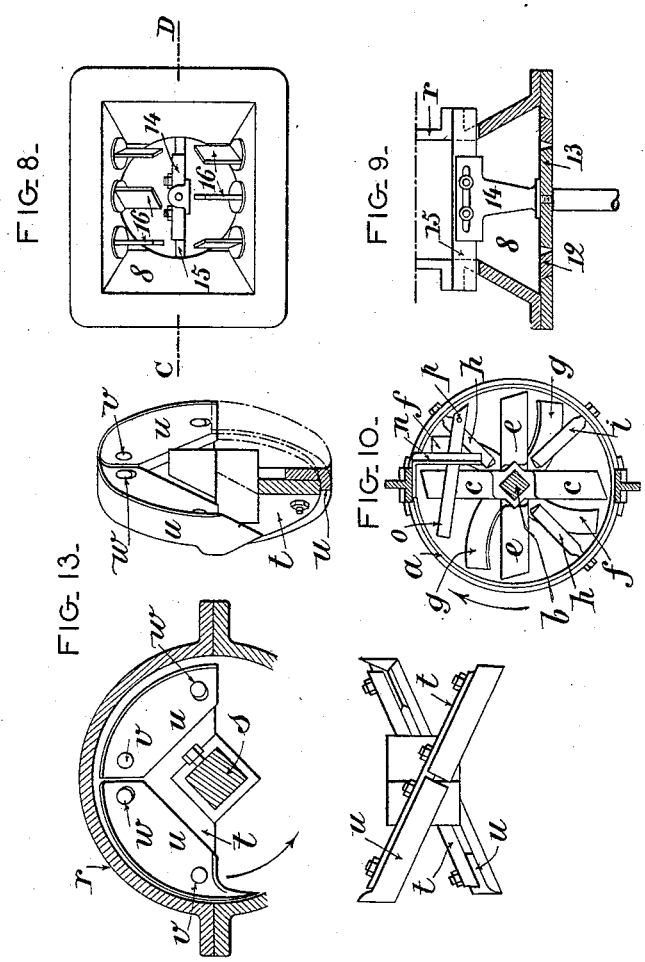

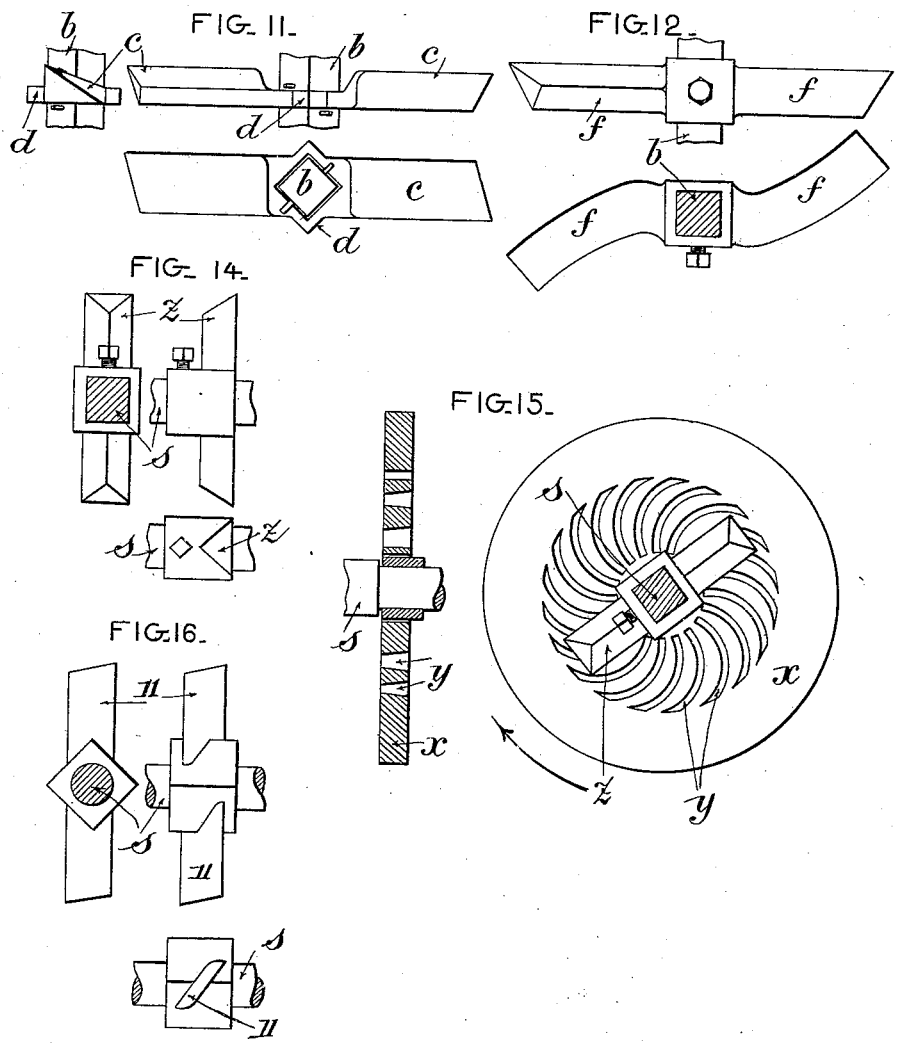

UNITED STATES PATENT OFFICE.

HENRY COIFFIER, EDMOND VIÉVILLE, AND ADOLPHE MAJESTÉ, OF NEUILLY, FRANCE.

MACHINE FOR MIXING AND MOLDING PLASTIC EARTHS.

SPECIFICATION forming part of Letters Patent No. 673,045, dated April 30, 1901.

Application filed June 1, 1900. Serial No. 18,721. (No model.)

*To all whom it may concern:*

Be it known that we, HENRY COIFFIER, gentleman, residing at No. 2 Rue Gabrielle, and EDMOND VIÉVILLE, earthenware manufacturer, residing at No. 10 Chemin de Meawe, Neuilly-Plaisance, and ADOLPHE MAJESTÉ, gentleman, residing at No. 22 Avenue de Neuilly, Neuilly-sur-Seine, in the Republic of France, have invented certain new and useful Improvements in Machines for Mixing and Molding Plastic Earths, of which the following is a specification.

This invention relates to a machine for mixing and molding plastic earths, and which is particularly intended for the manufacture of bricks, tiles, pipes, and the like, as usually obtained either by drawing or molding.

The new machine, comprising, essentially, a winged mixing device and a helical compressing device, the two devices being suitably combined together, automatically eliminates stones and other hard bodies mixed with the earths and produces in a single operation a very homogeneous and compact plastic mixture or paste having as great a degree of fineness as may be desired. It can do the same work in a manner quite as perfect as the whole of the plant heretofore employed, and which usually comprises a twin-screw mixing device, a pair of fluted cylinders, a pair of smooth cylinders, two finishing mixing devices, and either a screw or cylinder molding-machine.

Our machine requires very much less space than such a plant, can be set up at much less expense, and can be run with less motive power with an equal turn-out. Particular arrangements are made to prevent the breakage of either the mixing, compressing, or operating parts through the presence of stones or other hard bodies in the earths operated upon, so that the essential parts will run for a long while without any special supervision.

The accompanying drawings show, by way of example, one form of our invention.

Figure 1 is a right-hand side elevation of the improved machine. Fig. 2 is plan of the same. Fig. 3 shows the machine in elevation from behind. Fig. 4 is a part left-hand side elevation of the same. Fig. 5 is a section on the line A B of Fig. 1. Fig. 6 represents a drawing-plate. Fig. 7 is a longitudinal section of the machine. Fig. 8 is a front view, the drawing-plate being removed. Fig. 9 is a horizontal section on the line C D of Fig. 8. Fig. 10 is a horizontal section on the line E F of Fig. 7. Fig. 11 is a detail view of one of the upper arms of a mixing device. Fig. 12 represents one of the lower arms. Fig. 13 is a detail view of one of the blades of a compressing device. Fig. 14 represents arms or scrapers. Fig. 15 is a detail view of a grate. Fig. 16 shows dividing-arms.

Our machine for mixing or working up and molding plastic earths comprises a mixing or working-up tub $a$, arranged vertically, and into which the earth may be fed either direct or through a hopper placed above, the said hopper not being shown in the drawings. On a shaft $b$, revolving in the middle of the said tub, are arranged eight mixing-arms, the upper ones, $c$, Fig. 11, of which are integral with a common hub $d$, which is allowed a little play on the shaft $b$ in order that the said arms $c$ may be able to give way vertically to a certain extent while still being carried around by the rotation of the shaft. The arms $c$ are beveled in front and have a lower inclined face to push the earth downward when they revolve in the direction of the arrow shown in the drawings. The arms $e$, situated below the arms $c$, are similar to the latter and are allowed the same play on the shaft $b$. The lower arms $f$ $g$, rigidly fixed to the shaft $b$, are slightly curved instead of being straight, like those previously described. The former, $f$, Fig. 12, have a lower inclined face to push the earth downward. The latter, $g$, nearest the bottom have their upper face inclined to push the earth upward. The pairs of arms $c$ $e$ $f$ $g$ are placed alternatively at right angles to each other. The ends of all the said arms are cut away obliquely, as shown in Figs. 10 to 12, in such a manner that the space between them and the inner wall of the mixing-tub shall increase from the front part to the rear part of each of the said ends. Between the two first pairs of arms $c$ $e$ are arranged two inclined knives $h$, Figs. 7 and 10, set into the inner wall of the tub $a$ and allowed a certain amount of play in order to be able to give way somewhat vertically. Another inclined knife $i$ is rigidly fixed to the tub $a$ at a level intermediate between the arms $e$ and $f$. The bottom $j$ of the said tub $a$ has mounted above it a false bottom $k$, Fig. 7, which is held a short distance above it by a ring $m$. The said false bottom is loosely mounted on the shaft $b$ and is free to oscillate in all directions on the ring $m$. The tub $a$ also comprises an arm or abutment $n$, Fig. 7, fixed near its upper part and intended to prevent the earth heaped up in the opening of the apparatus from being immediately and bodily carried around by the revolving mixing-arms, and on one of the arms $c$ is fixed an arm $o$, carrying a scraper $p$, which serves to remove the earth from the edges of the tub $a$. The lower part of the tub is joined to a horizontal cylinder $r$, placed in free communication with the same and within which are arranged on a horizontal shaft $s$ a certain number of pieces, the details of which are shown in Figs. 13 and 14. The first three of the said pieces, Figs. 7 and 13, comprise each two semicircular blades $t$, placed obliquely and in opposite directions relatively to the said shaft $s$. The hub common to each pair of blades is rigidly fixed to the shaft $s$. Steel segments $u$, each equal to one-quarter of the circumference, are arranged at the periphery of the blades $t$. Each of the said segments is held on a blade by means of two bolts $v\ w$, the former of which, having no transversal play, serves as an axis on which the segment can oscillate, while the latter bolt $w$ passes through an oval-shaped hole, which allows the segment to move slightly in respect to the blade. The position of the said bolts is so determined that the space between the inner wall of the cylinder $r$ and the outer surface of the two segments $u$, mounted on any blade, shall constantly increase from the front part of the first segment (the direction of rotation is shown in the drawings by an arrow) to the rear part or end of the second segment. The said segments $u$ have their outer face cylindrical and their lateral face concave, as shown by Fig. 13.

The end of the cylinder $r$ opposite the one communicating with the mixing-tub $a$ is closed by a grate $x$, Fig. 15, provided with slits $y$, which are inclined relatively to the radii. The said slits are wider at the outlet-face than at the inlet-face. Toward the cylinder the surface of the grate $x$ is scraped by means of arms $z$, fixed on the shaft $s$, of triangular shape in cross-section and having their ends of pyramidal shape, as shown in Fig. 14. The said arms may be either straight or curved, and their forward edge is preferably inclined relatively to the radii in the opposite direction to that of the slits $y$ of the grate, Fig. 15. At the base of the grate $x$ an opening 1, Fig. 7, is made in the cylinder $r$ above a receptacle 2 for the discharge of the stones. The said receptacle is provided with a door 3 and with a discharging device 4, which may be operated from the outside by means of a lever 5, Fig. 1. The base of the mixing-tub $a$ is also provided with a discharge-receptacle 6, with a door 7, through which the stones gathered there may be taken out.

At the outer end of the cylinder $r$ is arranged a chamber 8, Fig. 7, into which passes the plastic earth properly mixed or worked and cleared of stones before being molded by drawing. The shaft $s$, which passes through the grate $x$, extends into the first part of the chamber 8, of cylindrical shape, and carries a piece 9, having blades and provided with segments 10, similar to those of the pieces situated in the interior of the cylinder $r$. The said piece or device 9 serves to scrape the outlet-face of the grate $x$ and also by its helical shape to further compress the plastic earth. The shaft $s$ carries also arms 11, intended to divide the earth, Fig. 16. In the opening of the chamber 8 may be applied different draw-plates 12, Fig. 6, the orifices of which are of varying form, according to the nature of the wares to be produced. To obtain hollow wares or pieces, a mandrel 13 is combined with the draw-plate 12. Instead of supporting the said mandrel by means of arcades fixed to the plate 12, as is usually the case, we prefer to fix the mandrel 13 to a support 14, Figs. 7 to 9, which may be fixed itself at several points to a cross-piece 15, situated within the chamber 8. At different points of the chamber 8 are arranged shutters 16, which may be fixed in place in any direction by means of nuts 17 and which are for the purpose of directing fillets of earth more particularly toward the parts of the draw-plate in which are the large passages. The products, issuing in a continuous band from the draw-plate 12, are received on a roller-apron 18, Figs. 1 and 2, where they may be cut in the well-known manner. When making hollow wares or pieces liable to collapse or fall in, we may fix to the mandrel 13 a more or less long arm 38, Fig. 7, for the purpose of holding for a certain time the piece being made.

The operation of our improved machine is as follows: The shafts $b$ and $s$ are put in motion by means of any suitable engine through the medium of a shaft 19, Figs. 1 to 4, of a secondary shaft 20, connected to the latter by gears 21 22, and of two series of gears 23 24 25 26 27 28 and 29 30 31 32 33 34, corresponding, respectively, to shafts $b$ and $s$. The plastic earth fed into the tub $a$ is mixed or worked up by the combined action of the movable arms $c\ e\ f\ g$ and fixed knives $h\ i$. It is at the same time pushed downward by the inclination of the arms $c\ e\ f$. Little by little the said earth runs into the cylinder $r$, where it is vigorously urged by the blades $t$ toward the grate $x$. After having passed through the latter it is further compressed by the blades $g$ and then divided by the arms 11. It passes between the shutters 16 and finally comes to the draw-plate 12, through which it runs in the required form—in that, for example, of hollow bodies 35, intended for bank-tiles.

The particular forms of the different mixing-arms, blade-segments, and scrapers are for the purpose of preventing stones, nails, or other hard bodies from coming and fixing themselves between the said parts and the inner walls of the mixing-tub $a$ and the cylinder $r$, more especially on account of the clearance secured behind the front parts of the movable members. The arms $e\ c$ are also made movable for the purpose of allowing the stones which come in contact with the front parts of the ends of the said arms to move away from such parts and the latter to slide either above or below such obstacles as are too rigid. The arms $f$ and $g$, which must have great resistance on account of the compactness already acquired by the earth toward the bottom of the tub $a$, are not movable. Their curved shape has the effect of pushing the earth from the center toward the periphery and facilitating its passage through the opening.

The false bottom $k$ is for the purpose of preventing breakage of the arms $g$ when stones come below the latter and might become fixed between the two parts. In the interior of the cylinder $r$ all danger of such fixation or breakage is prevented by the concave shape of the segments $u$, which remove the stones away from the inner walls of the cylinder, and also by the eccentric form of the said segments and their mobility, which is particularly yielding when headed nails have to pass. The latter are often found in certain earths, and they have formed heretofore a serious obstacle to use of piston molding machines. In our machine, on the contrary, when a nail comes in between the front cylinder $r$ it finds an ever-increasing space between the two parts, and if its head becomes engaged in the said space the segment can, if required, move slightly toward the center and allow the same to pass freely. The shape of the slits $y$ in the grate $x$, combined with that of the scrapers $z$, has the effect of moving from the center toward the periphery of such stones, as the grate cannot pass. The latter, carried forward little by little by the motion of the blades, come in following the periphery of the cylinder to the opening 1 and become, sometimes after having moved around several times, embedded in the earth contained in the receptacle 2. They gather there until they are removed by opening the door 3 and moving down the blade or web 4.

By means of the use of the shutters 16 the products issuing from the draw-plate 12 can receive a perfectly uniform consistency in every part of their cross-section instead of presenting greater compactness in some parts and gaps in others, as is nearly always the case when drawing wares with the apparatus hitherto used, the result being that drying and heating give rise to neither splitting nor arching of the goods.

The mode of fixing the mandrel independently of the draw-plate also offers the advantage of not interfering in any way with the passage of the earth and of not cutting the latter longitudinally, as is the case with the arcades which usually support the mandrels.

The mobility of the support 14 of the mandrel 13 on the cross-piece 15 is for the purpose of allowing the different mandrels to be fixed on the support nearly at the center of their pushing-surface.

There may be combined or coupled with the hereinbefore-described machine any or all of the well-known accessory devices, such as the crank-coupling for molding vertical pieces, a device for cutting the earth, devices for decorating or marking the wares, &c.

We claim—

1. A machine for mixing or working and molding plastic earths, comprising, in combination, a vertical or upright mixing-tub toward the bottom of which opens a compressing-cylinder closed by a grate and at the outer end of which is placed a chamber closed by a draw-plate, a series of movable mixing-arms and fixed knives arranged in the said tub, inclined blades and scrapers arranged in the said cylinder, inclined blades and dividing-arms situated in the said chamber, and a closed receptacle arranged laterally of the cylinder to receive the stones carried up to the periphery of the grate, substantially as described.

2. A machine for mixing and molding plastic earths, comprising in combination, a fixed grate and rotary arms or scrapers, the slits of the grate and the edges of the scrapers being inclined in opposite directions so as to cause the stones to slide from the center to the periphery when the said stones come to the grate together with the mixed earth, substantially as described.

3. A machine for mixing and molding plastic earths, comprising a cylindrical tub and mixing-arms having their ends cut away obliquely and giving clearance behind, and their hubs being mounted with a certain amount of play on the central shaft of the tub, substantially as described.

4. A machine for mixing and molding plastic earths, comprising a tub having a fixed bottom and a false bottom which is free to oscillate on a central support, and mixing-arms rigidly fixed to the central shaft of the said tub at a short distance from the said false bottom, substantially as described.

5. A machine for mixing and molding plastic earths, comprising a cylinder, inclined blades mounted on a shaft situated on the axial line of the said cylinder, each blade being provided with eccentric segments, concave in side view, and which are free to oscillate slightly around their front end, substantially as described.

6. A machine for mixing and molding plastic earths, comprising, within a chamber closed by a draw-plate, shutters which can be fixed at will in any direction and independently one of another, substantially as described.

7. A machine for mixing and molding plastic earths, comprising a draw-plate, a mandrel abutting in the interior of the orifice of the said draw-plate and a support fixed to the mandrel to give interior support to the hollow products or wares issuing from the machine, substantially as described.

8. A machine for mixing and molding plastic earths, comprising a mixing-tub with mixing-arms having a certain amount of play on their axis, rigid arms, an oscillating false bottom and fixed knives, a compressing-cylinder with inclined blades having eccentric, concave, and movable segments, arms or scrapers, a grate having slits inclined relatively to the edges of the scrapers, a chamber closed by a draw-plate and inclosing inclined blades, dividing-arms, shutters which can be adjusted in any desired direction, a cross-piece with mandrel-support, a mandrel extended to the outside by means of a supporting-arm, a discharge-receptacle communicating with the lower part of the mixing-tub, and a discharge-receptacle communicating with the end of the cylinder adjacent to the said grate, substantially as described, and shown in the accompanying drawings.

In testimony that we claim the foregoing as our invention we have signed our names in presence of two subscribing witnesses.

HENRY COIFFIER.
EDMOND VIÉVILLE.
ADOLPHE MAJESTÉ.

Witnesses:
CAMILLE BLÉTRY,
EUGÈNE WATTIER.